(12) United States Patent
Brown (10) Patent No.: US 7,272,849 B2
(45) Date of Patent: Sep. 18, 2007

(54) SYSTEM AND METHOD FOR SHARING DATA

(75) Inventor: Michael T. Brown, Flemington, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1169 days.

(21) Appl. No.: 09/838,807

(22) Filed: Apr. 20, 2001

(65) Prior Publication Data

US 2002/0157026 A1 Oct. 24, 2002

(51) Int. Cl.
*H04L 9/32* (2006.01)
*H04L 9/00* (2006.01)

(52) U.S. Cl. .................. 726/2; 726/3; 726/4; 713/166
(58) Field of Classification Search ............ 713/182, 713/166; 711/164; 726/2–7, 17
See application file for complete search history.

(56) References Cited

U.S. PATENT DOCUMENTS

| 5,623,637 | A | * | 4/1997 | Jones et al. ............ 711/164 |
| 5,848,412 | A | * | 12/1998 | Rowland et al. ......... 707/9 |
| 6,055,510 | A | * | 4/2000 | Henrick et al. .......... 705/14 |
| 6,367,009 | B1 | * | 4/2002 | Davis et al. ............ 713/166 |
| 6,941,459 | B1 | * | 9/2005 | Hind et al. ............. 713/167 |

FOREIGN PATENT DOCUMENTS

EP 844767 A1 * 5/1998

OTHER PUBLICATIONS

Schneier, Applied Cryptography, 1996, John Wiley, 2nd Edition, pp. 193-194.*
Stallings, Network and Internetwork security, 1995, Prentice Hall, pp. 135-136.*
James G. Douvikas, et al; E-Service To Manage Contact Information And Signature E-Card; U.S. Appl. No. 09/507,631, filed Feb. 18, 2000.
James G. Douvikas, et al; E-Service To Manage Contact Information And Track Contact Location; U.S. Appl. No. 09/507,043, filed Feb. 18, 2000.
James G. Douvikas, et al; E-Service To Manage Contact Information With Privacy Levels; U.S. Appl. No. 09/507,215, filed Feb. 18, 2000.
James G. Douvikas, et al; E-Service To Manage And Export Contact Information U.S. Appl. No. 09/507,632, filed Feb. 18, 2000.

* cited by examiner

*Primary Examiner*—Hosuk Song (57) ABSTRACT

The present disclosure relates to a system and method for sharing user information. The system and method involve the steps of receiving a request from a web site host for information concerning a user that has visited a web site maintained by the web site host, verifying the authorization of the web site host to receive the information, determining the level of access for which the web site host is authorized, and transmitting user information to the web site host such that the web site host can personalize the web site for the user.

24 Claims, 8 Drawing Sheets

SYSTEM AND METHOD FOR SHARING DATA

FIELD OF THE INVENTION

The present disclosure relates to a system and method for sharing data. More particularly, the disclosure relates to a system and method for sharing user information with web site hosts when a web site is visited by the user.

BACKGROUND OF THE INVENTION

Many product and service retailers maintain web sites that are accessible over the Internet. Oftentimes, the retailers attempt to personalize the web sites for the visitor by collecting information about the visitor and requiring him or her to log in with the web site before browsing through it. This visitor information can comprise personal information such as the visitor's identity, addresses, and phone numbers; purchasing information such as a credit card information and a billing address; and profile information such as demographic information, interests, and so forth. The information can be collected in various ways. Most commonly, the information is either obtained directly from the visitor by having the visitor complete an online questionnaire, or indirectly by tracking selections or other actions made by the visitor while the visitor browses the web site.

With this information, the web site can be personalized for the visitor to one degree or another so as to provide more direct access to the products and/or services in which the visitor is likely to be interested. By collecting this information, various advantages are obtained both for the visitor and the retailer. From the perspective of the visitor, the search for particular items can be expedited in that these items can be displayed for the visitor, for example, on the web site's home page. To cite a specific example, where the visitor has communicated an interest in sports to an online bookseller, the visitor can be presented with a list of the newest and/or most popular sports books being offered by the bookseller when the visitor visits the bookseller's web site. From the perspective of the retailer, sales are more likely where the visitor is offered items in which the user has expressed an interest.

Although data collection in the manner described above provides clear advantages to both the visitor and the retailer, several disadvantages currently exist. One significant drawback is that the visitor information is collected on a site-by-site basis and therefore typically is not shared between sites. Accordingly, where personalization is desired, the visitor may need to enter his or her information repeatedly at many different sites. In addition, when the visitor wishes to return to the site, he or she normally must remember (or have recorded) a username and password that are used to identify the visitor and therefore permit personalization of the site. Where the visitor has registered with several different sites, the visitor may need to remember (or have recorded) many different usernames and/or passwords. Moreover, where the user wishes to change the information the web site host maintains (e.g., if the visitor moves or his or her interests change in some way), the information must be corrected on an individual basis at each site.

Another significant problem relates to security. Even where one or more sites are "secure," visitors often do not feel comfortable with the idea of sharing personal or other sensitive information such as home addresses, credit card numbers, etc. with web site hosts unless necessary to make an online purchase. Unfortunately, however, personalization of the visited web site may not be feasible without exchange of such information, especially where this information was given to the web site host on a previous visit. In addition to security concerns, a further drawback of present systems is that the visitor often does not have control over the profile created for the user. For instance, where the visitor visits an online bookseller to purchase a book for a friend, an incorrect profile may be formulated by the web site host if the web site is adapted to track visitor selections. Specifically, the host may mistakenly view the visitor purchase as an indication that the visitor is personally interested in the subject to which the book pertains.

From the foregoing, it can be appreciated that it would be desirable to have a system and method for sharing information that avoids one or more of the disadvantages identified above.

SUMMARY OF THE INVENTION

The present disclosure relates to a method for sharing user information. The method comprises the steps of receiving a request from a web site host for information concerning a user that has visited a web site maintained by the web site host, verifying the authorization of the web site host to receive the information, determining the level of access for which the web site host is authorized, and transmitting user information to the web site host such that the web site host can personalize the web site for the user.

The present disclosure also relates to a method for acquiring user information that is used to personalize a web site for the user. This method comprises the steps of receiving a user code from a user, the user code being associated with a particular information set pertinent to the user, requesting user information from a centralized repository that stores the user information by providing the user code to the centralized repository, and receiving the information set associated with the user code.

In addition to these methods, the present disclosure relates to a system for sharing user information comprising means for receiving a request from a web site host for information concerning a user that has visited a web site maintained by the web site host, means for verifying the authorization of the web site host to receive the information, means for determining the level of access for which the web site host is authorized, and means for transmitting user information to the web site host such that the web site host can personalize the web site for the user.

Furthermore, the present disclosure relates to a system for acquiring user information that is used to personalize a web site for the user comprising means for receiving a user code from a user, the user code being associated with a particular information set pertinent to the user, means for requesting user information from a centralized repository that stores the user information by providing the user code to the centralized repository, and means for receiving the information set associated with the user code.

Other features, advantages systems, and method provided by the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
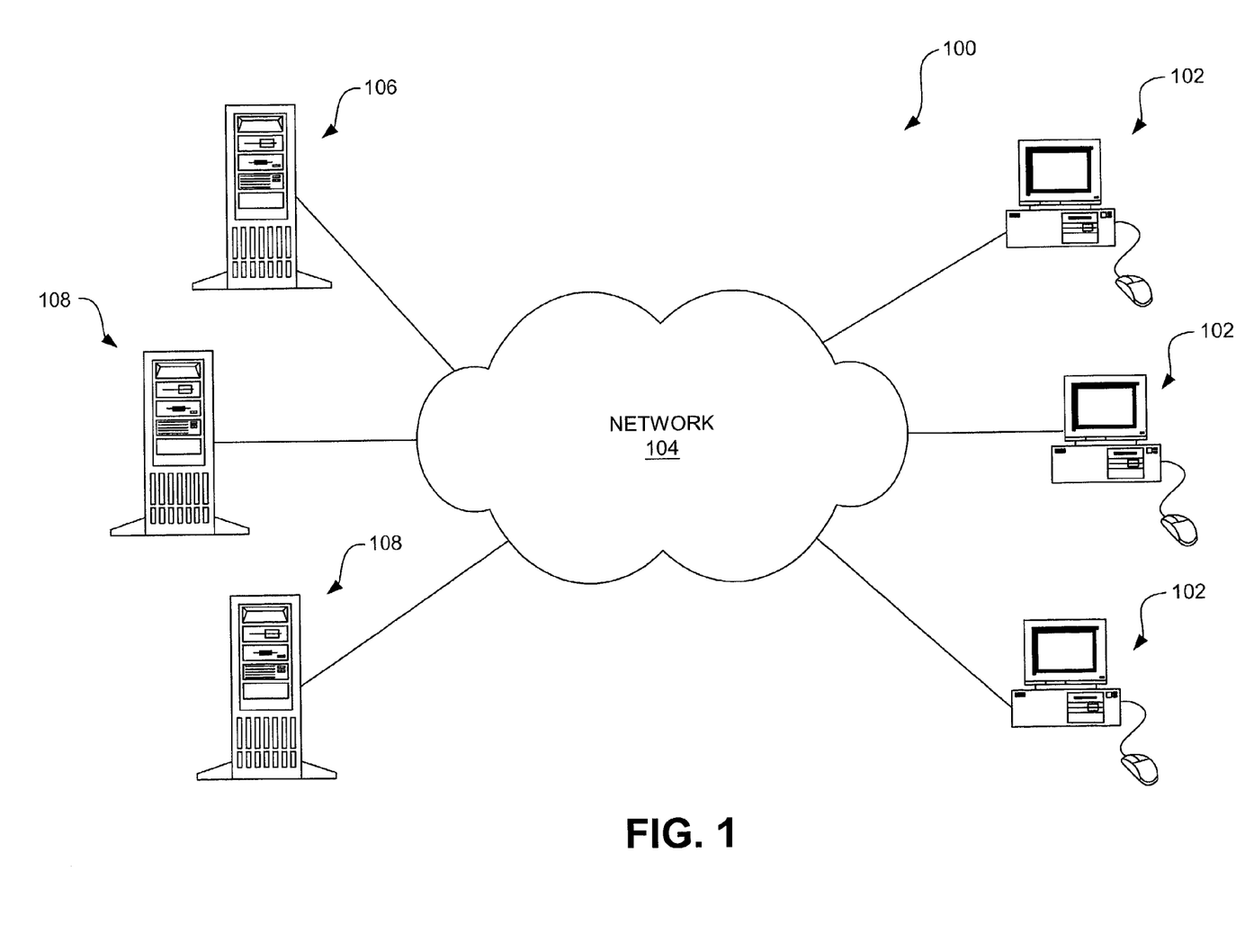
FIG. 1 is a schematic view of a system for sharing data.

Referring now in more detail to the drawings, in which like numerals indicate corresponding parts throughout the several views, FIG. 1 illustrates a system 100 for sharing data. As indicated in this figure, the system 100 can comprise one or more computing devices 102 that are each connected to a network 104. As suggested by FIG. 1, the computing devices 102 can each comprise personal computers (PCs) such as desktop computers. However, as will be apparent from the discussion that follows, the particular configuration of the computing device 102 is generally unimportant to the present invention. More important is that the computing devices 102 are in some way connected to the network 104 (directly or wirelessly) and are capable of communicating via the network 104. Therefore, the computing devices 102 can comprise substantially any device capable of connecting to the network 104 and transmitting data across and/or receiving data from the network including network-enabled personal digital assistants (PDAs) and mobile telephones.

The network 104 can comprise one or more networks that are communicatively coupled. The networks can include, for example, a local area network (LAN) and/or a wide area network (WAN). In a preferred arrangement, however, the network 104 is a set of networks that make up part of the Internet. Further included in the system 100 shown in FIG. 1 is an e-service host server 106 and one or more web site host servers 108. Where, as indicated above, the network 104 comprises the Internet, each of the servers 108 comprises a web server capable of generating and uploading web sites and/or web pages to the Internet and, more particularly, the World Wide Web. As indicated in the figure, each of the servers 106 and 108 is connected to the network 104, typically through a direct, physical connection.

Figure 2:
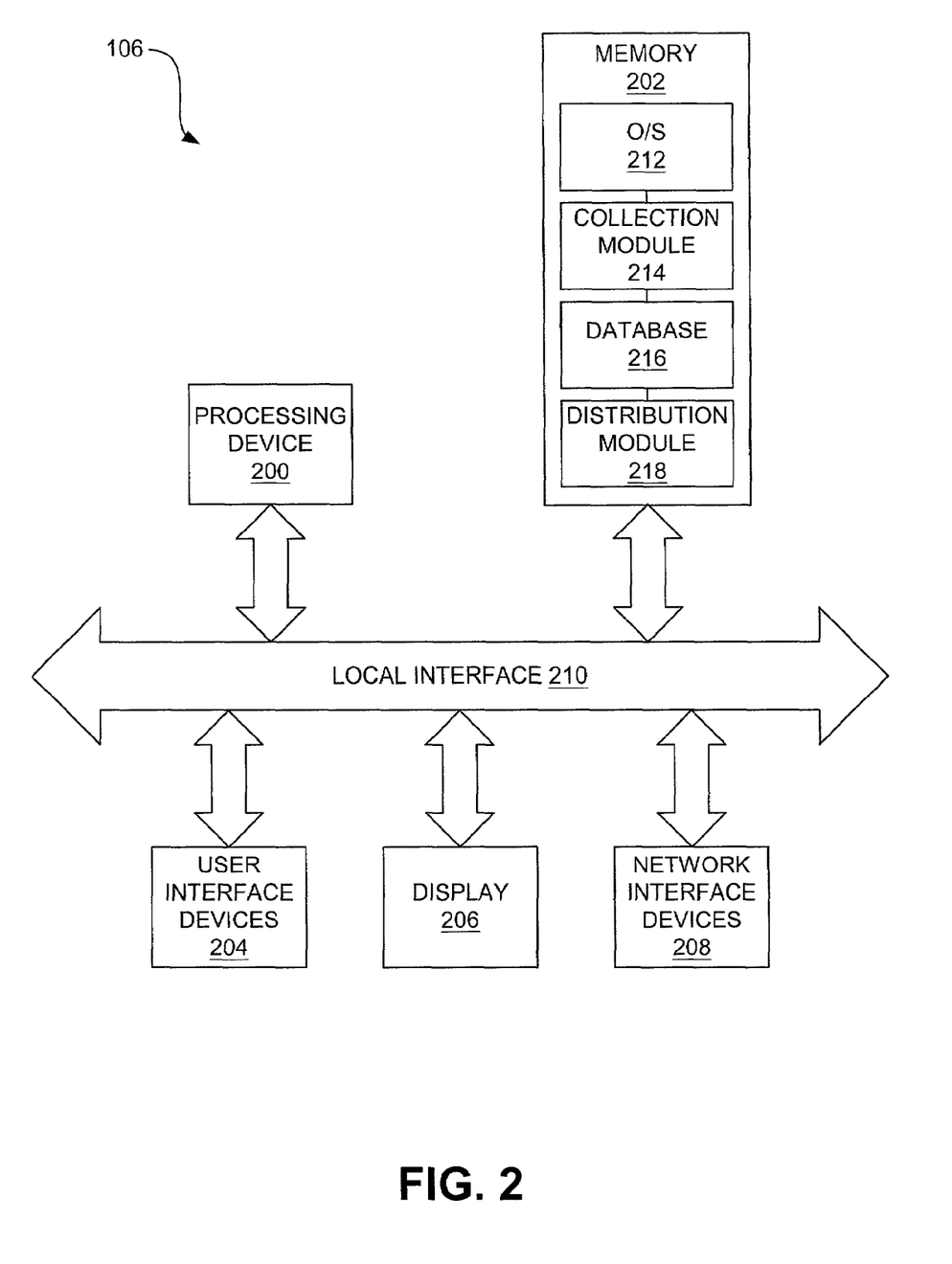
FIG. 2 is a schematic view of an e-service host server shown in FIG. 1.

FIG. 2 is a schematic view illustrating an example architecture for the e-service host server 106 shown in FIG. 1. As indicated in FIG. 2, the e-service host server 106 comprises a processing device 200, memory 202, user interface devices 204, a display 206, and network interface devices 208. Each of these components is connected to a local interface 210 that, by way of example, comprises one or more internal buses. The local interface 210 may have additional elements, which are omitted for simplicity, such as controllers, buffers (caches), drivers, repeaters, and receivers to enable communications. Furthermore, the interface 210 may include address, control, and/or data connections to enable appropriate communications among the aforementioned components.

The processing device 200 comprises hardware for executing software and/or firmware that is stored in memory 202. The processing device 200 can include any custom made or commercially available processor, a central processing unit (CPU), an auxiliary processor among several processors associated with the e-service host server 106, a semiconductor based microprocessor (in the form of a microchip), or a macroprocessor. The memory 202 can include any one of combination of volatile memory elements (e.g., random access memory (RAM, such as DRAM, SRAM, etc.)) and nonvolatile memory elements (e.g., ROM, hard drive, tape, CDROM, etc.). Moreover, the memory 202 can incorporate electronic, magnetic, optical, and/or other types of storage media. Note that the memory 202 can have a distributed architecture, where various components are situated remote from one another, but accessible by the processing device 200.

The user interface devices 204 typically comprise those normally used in conjunction with a desktop computer such as a keyboard, mouse, etc., and the display 206 typically comprises a monitor. The network interface devices 208 comprise the hardware with which the e-service host server 106 transmits and receives information over the network 104. By way of example, the network interface devices 208 include components that communicate both inputs and outputs, for instance, a modulator/demodulator (e.g., analog, digital subscriber line (DSL), or cable modem), a radio frequency (RF) or other transceiver, a telephonic interface, a bridge, a router, etc.

As indicated in FIG. 2, the memory 202 comprises various software programs. In particular, the memory 202 includes an operating system 212, a data collection module 214, a database 216, and a data distribution module 218. The operating system 212 controls the execution of other software, such as the collection and distribution modules 214 and 218, and provides scheduling, input-output control, file and data management, memory management, and communication control and related services. The data collection module 214 comprises one or more applications with which information about a user is collected by the e-service host server 106. The operation of the data collection module 214 is described in detail with reference to FIG. 4. The database 216 contains the various user information collected by the data collection module 214 and, as is discussed below, serves as a central repository for the user information. Finally, the data distribution module 218 is used to distribute (i.e., share) data with other servers connected to the network 104 such as web site host servers 108 shown in FIG. 1. The operation of the data distribution module 218 is discussed in detail below in relation to FIG. 5.

Figure 3:
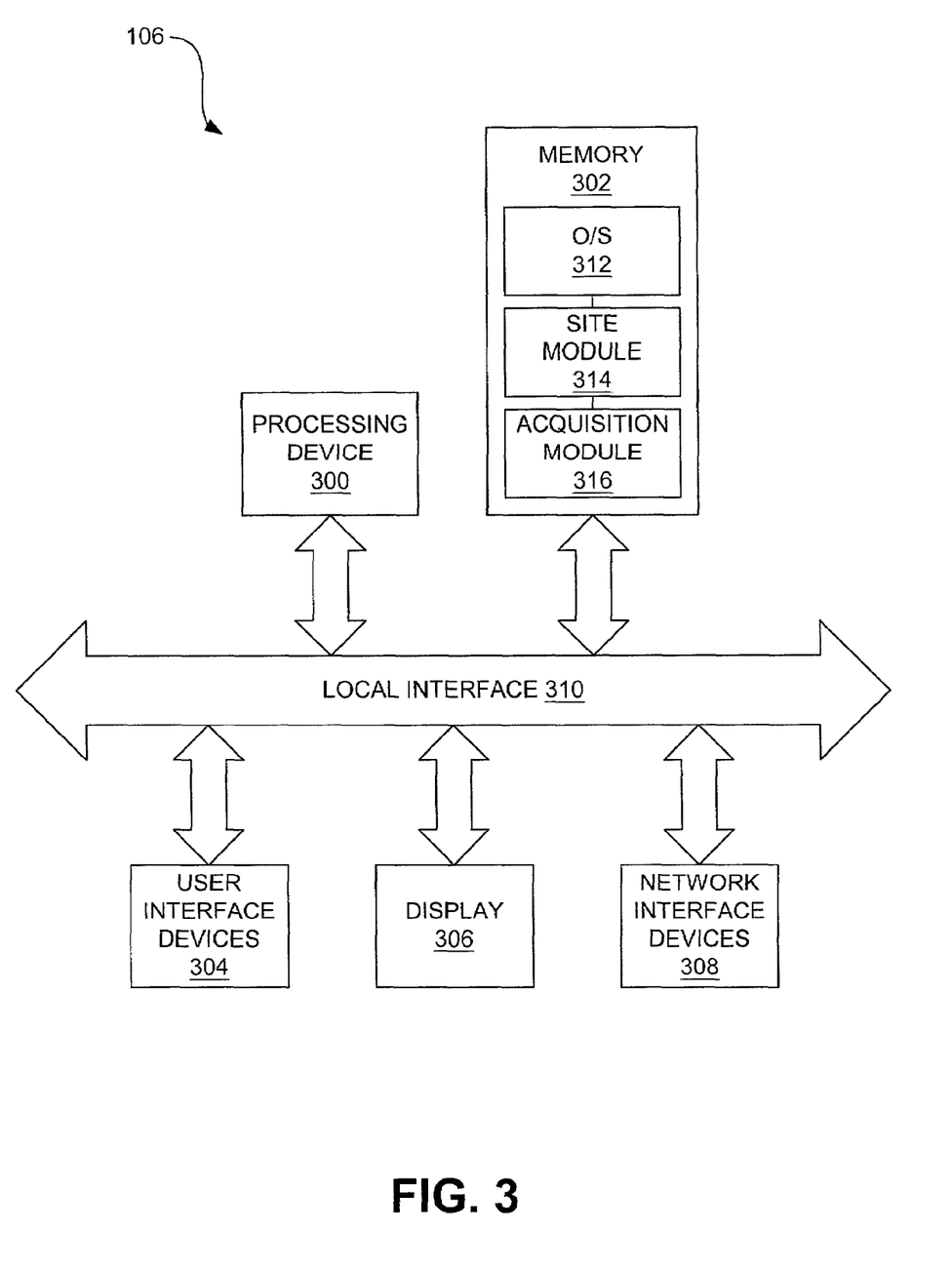
FIG. 3 is a schematic view of a web site host server shown in FIG. 1.

FIG. 3 is a schematic view illustrating an example architecture for the web site host servers 108 shown in FIG. 1. As indicated in FIG. 3, each web site host server 108 can be similar in construction to the e-service host server 106. Therefore, each web site host server 108 can comprise a processing device 300, memory 302, user interface devices 304, a display 306, network interface devices 308, and a local interface 310 to which each of the other components electrically connects. The processing device 300 can again include any custom made or commercially available processor, a central processing unit (CPU) or an auxiliary processor among several processors associated with the web site host server 108, a semiconductor based microprocessor (in the form of a microchip), or a macroprocessor. Similarly, the memory 302 can also include any one of combination of volatile memory elements (e.g., random access memory (RAM, such as DRAM, SRAM, etc.)) and nonvolatile memory elements (e.g., ROM, hard drive, tape, CDROM, etc.). The user interface devices 304 typically comprise those normally used in conjunction with a desktop computer such as a keyboard, mouse, etc., and the display 306 typically comprises a monitor. The network interface devices 308 comprise the hardware with which the web site host server 108 transmits and receives information over the network 104.

The memory 302, like memory 202 of the e-service host server 106, comprises various software programs including an operating system 312, a web site module 314, and a data acquisition module 316. The operating system 312 controls the execution of other software, such as the data acquisition module 316, and provides scheduling, input-output control, file and data management, memory management, and communication control and related services. The web site module 314 comprises the various information with which web sites and/or web pages can be generated and uploaded to the network 104, while the data acquisition module 316 is used to acquire user information that is distributed by the e-service host and, more particularly, the e-service host server 106. The operation of the data acquisition module 316 is discussed in detail below in relation to FIG. 6.

Various software modules have been described herein. It is to be understood that these modules can be stored on any computer readable medium for use by or in connection with any computer related system or method. In the context of this document, a computer readable medium is an electronic, magnetic, optical, or other physical device or means that can contain or store a computer program for use by or in connection with a computer related system or method. These modules can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Figure 4:
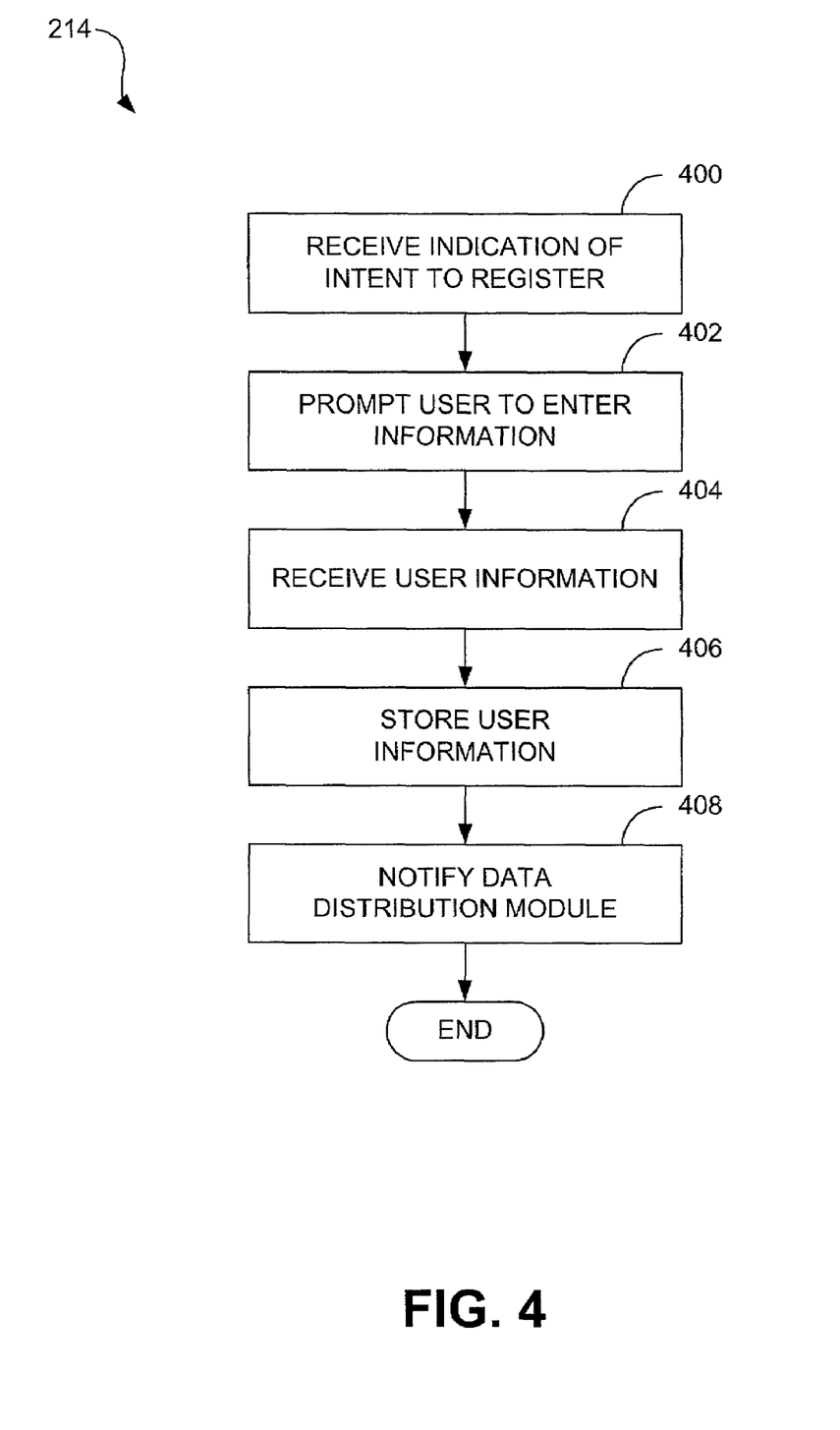
FIG. 4 is a flow diagram that illustrates operation of a data collection module shown in FIG. 2.

FIG. 4 illustrates operation of the data collection module 214 of the e-service host server 106. By way of example, the data collection module 214 can comprise the commands necessary to generate and operate a web site which is used to collect information from a visitor to, i.e. user of, the site. Alternatively, the data collection module comprises an application that runs on a computing device, such as computing device 102, which is used to collect the information. In either case, the data collection module 214 first receives an indication of an intent to register as indicated in block 400. Where the data collection module 214 comprises a web site or other application, this indication of intent can be the selection of an on-screen "button" displayed to the user. Once the indication has been received by the data collection module 214, the module can prompt the user to enter user information, as indicated in block 402. As will be appreciated by persons having ordinary skill in the art, the user can be prompted in many different ways. For instance, where the data collection module 214 includes a web site or an application running on a computing device such as a computing device 102, the user can be provided with a plurality of data fields in which the user can input information. The nature of the information prompted for can vary depending upon the situation. By way of example, however, the data collection module 214 typically prompts the user for personal, purchase, and profile information. Personal information comprises information particular to the user as an individual such as the user's name, social security number, phone numbers, addresses (both email and standard), etc. Purchase information includes information that facilitates online purchases such as credit card information, bank account information, billing addresses, shipping addresses, and so forth.

Like the personal information, the profile information comprises information particular to the user. However, no information as to the identity of the user is included in the profile information. By way of example, the profile information can include demographic information such as income bracket, highest level of education attained, the area of the country in which the user resides (e.g., west vs. east, city vs. rural), age group, ethnicity, occupation, and the like. Furthermore, the profile information can include information as to the user's interests. For reasons explained below, the user may wish to separate the interests information into various categories to control what information is provided to hosts of the web sites the user visits. By way of example, these categories can include personal, professional, and financial. Within each category (or within a single, all-encompassing category where applicable) the interests information can include an identification of types of products and/or services the user is most interested in, the user's hobbies, etc.

The user information can be collected in a variety of ways. In one arrangement, the user manually enters this information within data fields presented to the user in one or more questionnaire "screens" (e.g., web pages). In another arrangement, this information is entered by the user by selecting items from lists (e.g., pull-down menus) presented to the user. As is explained below, the information provided by the user permits web site hosts to custom-tailor (i.e., personalize) their web sites for the user. Although the amount of information that is entered may be large, economy of time is achieved in that, as will be apparent from the discussion that follows, the user will not be required to manually enter this information at each web site the user visits, or later correct/update this information at each site. It is to be appreciated that much, if not all, of the requested information can, optionally, be omitted as the user sees fit.

As the user enters the information, or after its entry is completed and then transmitted to the data collection module 214, the collection module receives the information, as indicated in block 404. Preferably, due to the sensitivity of the information, security is provided for the transmission (e.g., encryption) to protect the information. At this point, the data collection module 214 stores the information within the database 216 of the memory 202, as indicated in block 406. In that this database 216 is also used to store user information for other users of the e-service, the database serves as a central repository from which information is distributed to web site hosts under the control of the users. After or simultaneous to this storage, the data collection module 214 notifies the data distribution module 218 that the user's information is now available for distribution (i.e., sharing) with various web site hosts, as indicated in block 408. Once receiving this notification, the data distribution module 218 can correlate one or more user codes with particular portions of the user information (i.e., information sets) such that, as is explained below, particular pieces of information can be shared with the web site hosts in accordance with the user's wishes.

Figure 5:
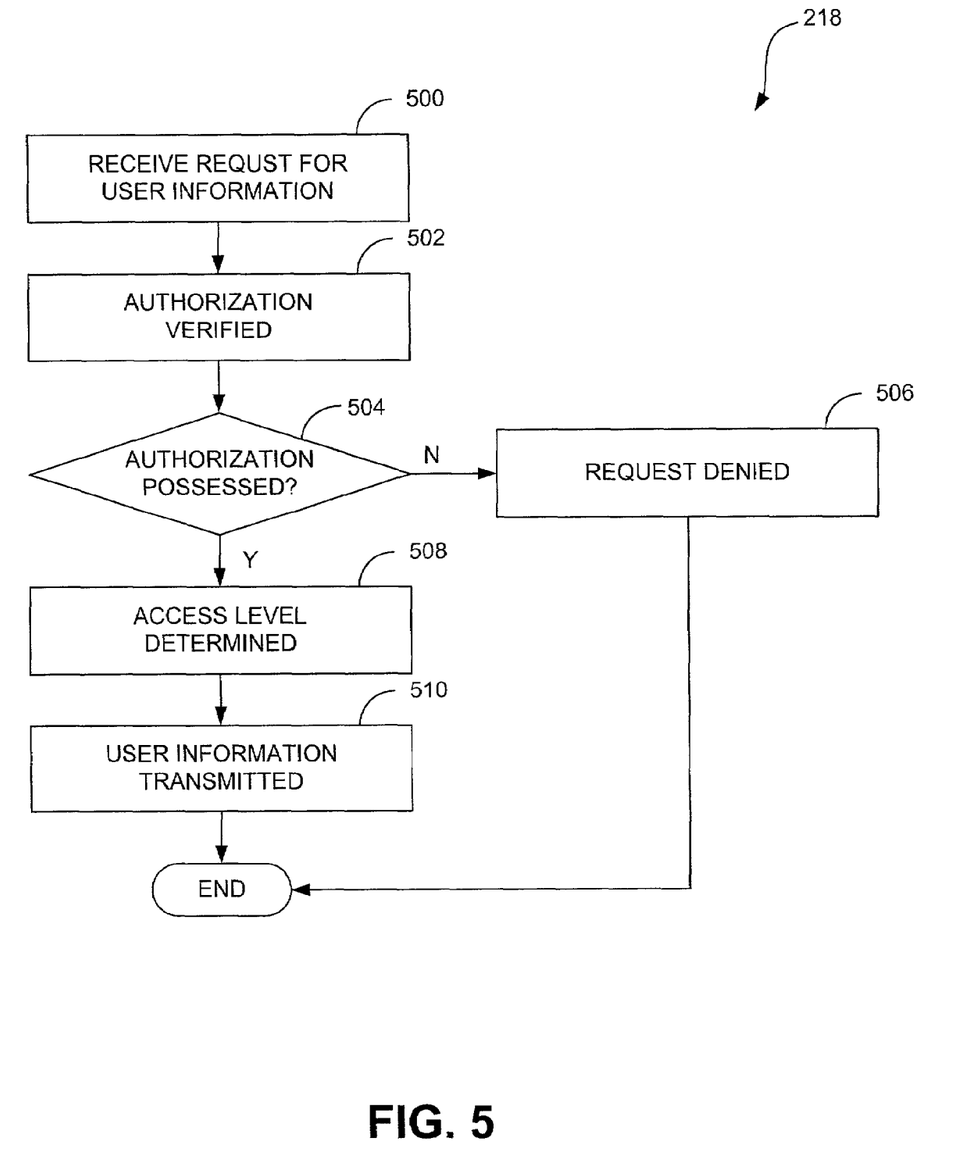
FIG. 5 is a flow diagram that illustrates operation of a data distribution module shown in FIG. 2.

FIG. 5 illustrates operation of the data distribution module 218 of the e-service host. As indicated in block 500, the data distribution module 218 receives requests for user information. More particularly, the data distribution module 218 receives requests from web site hosts in response to a particular user's visit to a web site that is maintained by the web site host. Once the request is received, the data distribution module 218 verifies the web site host's authorization to receive the requested information, as indicated in block 502. Specifically, as indicated in decision element 504, it is determined whether authorization is possessed by the web site host. If not, flow continues to block 506 at which the request is denied and flow is later terminated. If the web site host does have authorization, however, flow continues to block 508 at which the data distribution module 218 determines the level of access to the user information for which the host has authorization. As is described below, the level of access dictates which pieces of user information the web site host will receive from the e-service host. Again, only information that the user wishes to be shared will be distributed. Next, the pertinent information is securely transmitted to the web site host, as indicated in block 510, and flow is then terminated.

Figure 6:
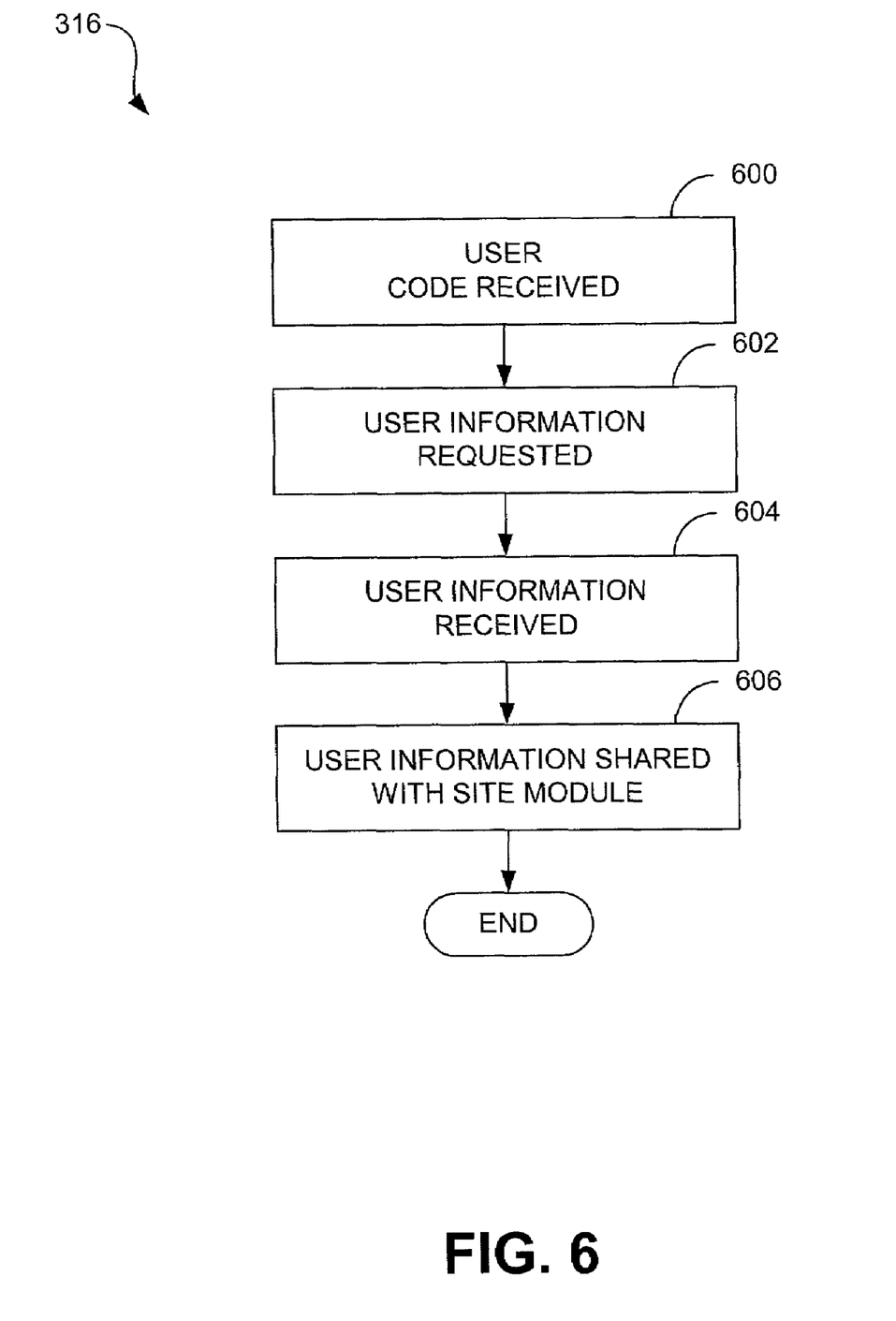
FIG. 6 is a flow diagram that illustrates operation of a data acquisition module shown in FIG. 3.

FIG. 6 illustrates operation of the data acquisition module 316 of the web site host. As indicated in block 600, the data acquisition module 316 first receives a user code that identifies the user to the web site host as a participant in the information sharing e-service. By way of example, this user code is automatically received by the web site host when the user visits a web site, or is manually entered by the user upon arrival at the web site. In either case, the data acquisition module 316 then requests user information from the e-service host, as indicated in block 602, by presenting this user code to the e-service host. Assuming the user code to be proper and correct, the data acquisition module 316 then receives user information from the e-service host, as indicated in block 604. As identified above, the type of information that is received depends upon the level of access bestowed upon the web site host. As will be apparent from the discussion that follows, this level of access is dictated by the particular code that was received by the data acquisition module 316 in block 600. Once the user information is received, the data acquisition module 316 shares this information with the site module 314, as indicated in block 606, such that the site module can use this information to generate a personalized web site for the user.

Figure 7:
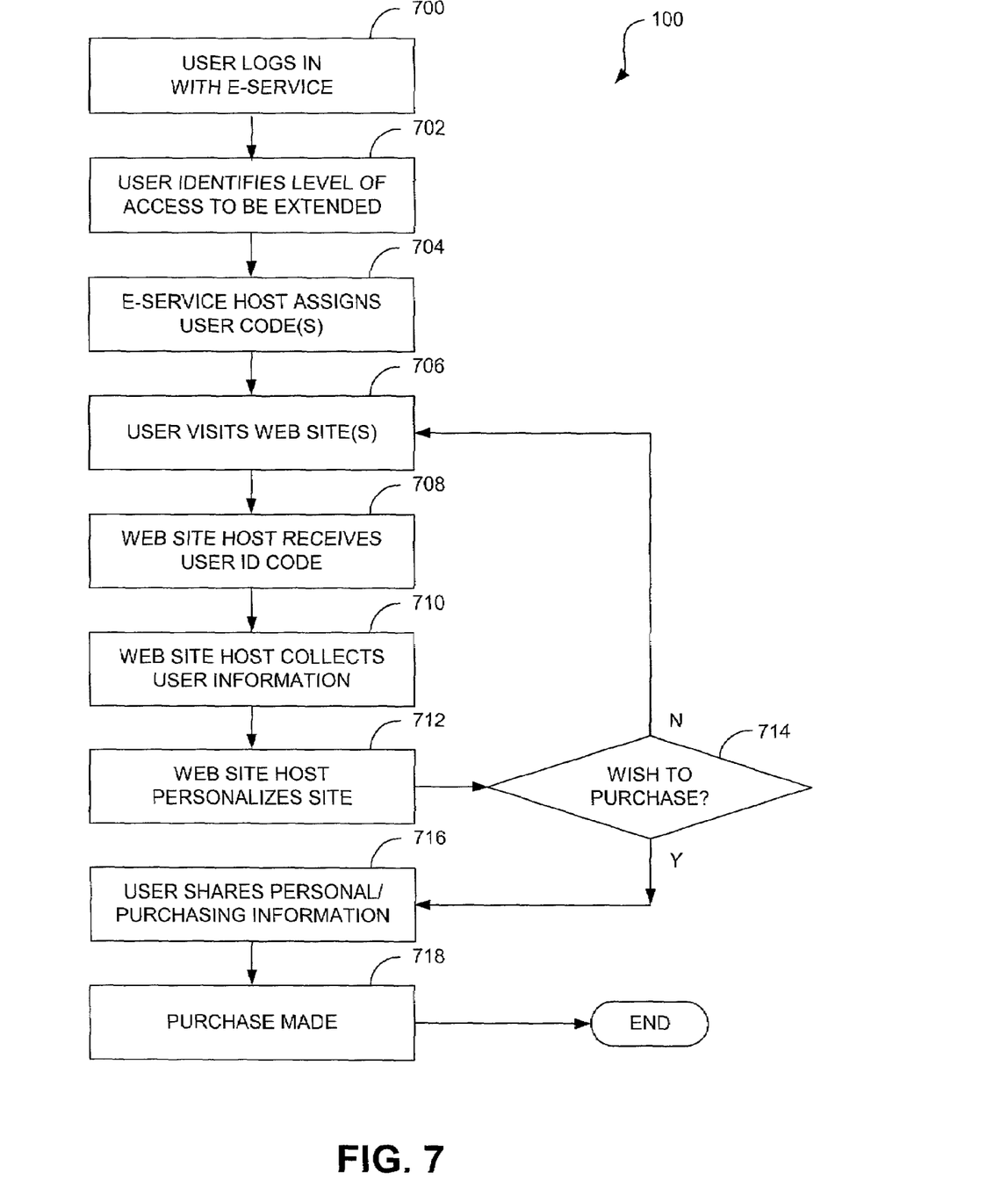
FIG. 7 is a flow diagram that illustrates a first method for sharing user information.

FIG. 7 is a flow diagram that illustrates a first method for sharing user information utilizing the system 100 shown in FIG. 1. As indicated in block 700, a user first logs in with the e-service that, as described above in relation to FIG. 4, previously collected the user's information. This log in can be accomplished, for instance, with a computing device that is directly connected to the e-service host's server 106. Typically, however, log in is achieved via a computing device, such as a computing device 102, that is linked to the e-service host server 106 through the Internet. Log in can comprise entry of user identification codes such as, for instance, a username and password. Although the user will need to remember or store this information for later use, the user will need to maintain only one such username and password combination in that the user information stored by the e-service host server 106 can be shared with a potentially unlimited number of web site hosts.

Once the user has logged in with the e-service, the user can then identify the level of access that will be extended to web site hosts during visits to their web sites. By way of example, the user can be prompted for this information with a web page that is presented to the user after the user logs in with the e-service. In one arrangement, the user can be provided with several prearranged sharing options including: (i) an anonymous mode in which no information whatsoever is shared with the web site hosts, (ii) an anonymous mode in which no personal information (e.g., identity) or financial information (e.g., credit card number) is shared, but in which profile information (e.g., interests) are shared, and (iii) a full disclosure mode in which all available user information is shared with the web site hosts. Although three different options are identified above, it is to be understood that many other options are feasible. In addition, the user could, alternatively, be prompted to manually select each piece of information that will be shared (or withheld).

In addition to selecting the level of access, the user can further select the category of information to share, where applicable. For instance, if the user foresees shopping for books related to his or her job, the user may wish to select the professional category prior to visiting web sites that offer books for sale. On the other hand, where the user is shopping for novels, the user may wish to designate the personal category. Operating in this manner, the user has great control over what information web site hosts receive about the user. Not only does this provide the user with greater security in that the user can withhold sensitive information while browsing the various web sites, this also allows the user to control the content that is presented to the web site host in that the user may decide which information (e.g, interests information) is shared with the host.

After the level of access to be extended is identified, as indicated in block 702, the e-service host assigns one or more user codes to the user, as indicated in block 704. Where multiple codes are assigned, each code is associated with a different level of access and, therefore, different information sets. The code pertinent to the initial desired level of access is automatically shared with web site hosts upon arrival of the user at their web sites. For example, if the user has determined to share profile information with web site hosts, but wishes to remain anonymous, the code will permit the host to obtain only profile information of the user. By way of example, the relevant user code can be automatically appended to the uniform resource locator (URL) of any site the user visits, although persons having ordinary skill in the art will appreciate that alternative means for sharing the codes apply. For purposes of security, the user codes preferably are generated anew each time the user logs in with the e-service. In addition, each code preferably is temporary such that it will expire after the satisfaction of particular criteria. By way of example, the user codes comprise transient keys that expire after a given period of time (e.g., 1 hour), or upon the occurrence of a particular event (e.g., visitation of a predetermined number of web sites). Due to the temporary nature of the user codes, the security of the user information is increased.

Once the user code or codes are assigned, the user can visit one or more web sites as indicated in block 706. Upon arriving at a given web site, the web site host receives the user code that corresponds to the level of access the user has determined to, at least initially, extend to the host, as indicated in block 708. With this code, the web site host can, as indicated in block 710, collect the designated user information by requesting it from the e-service host as described above in relation to FIG. 6. Once this information is collected, it can then be used to personalize the web site presented to the user, as indicated in block 712. Specifically, the web site host can use the profile information to present the user with items that, based upon the profile information, the user may be interested in purchasing. The user can therefore more easily locate items which he or she maybe seeking.

If the user is operating in an anonymous mode in which profile information is shared and the user locates an item in which he or she is interested, the user can determine whether he or she would like to purchase the item, as indicated in decision element 714. If not, flow returns to block 706 and the user can, for example, visit another web site. If the user would like to purchase the item, flow then continues to block 716 at which the user shares personal and/or purchase information with the web site host. This information can be shared with the web site host in several different ways. In the most direct method, the user can simply manually enter the information at the visited web site. Alternatively, where more than one code was assigned to the user by the e-service host, the user can enable collection of the other information by manually entering another code (e.g., a further transient key) that permits the web site host to access a more sensitive information set. In another alternative, the user can simply return to the e-service host web site (where applicable) and select a different level of access and then return to the web site at which the item was located (in which case the other code is automatically shared with the web site host). In any case, the user can then purchase the item, as indicated in block 718. Notably, although personal and/or purchasing information is shared in this process, the user preserves the ability to visit to the web site in an anonymous fashion at a later time in that the user code(s) provided to the web site host at that later time will be different from that or those which was or were given to the host in the previous visit.

Figure 8:
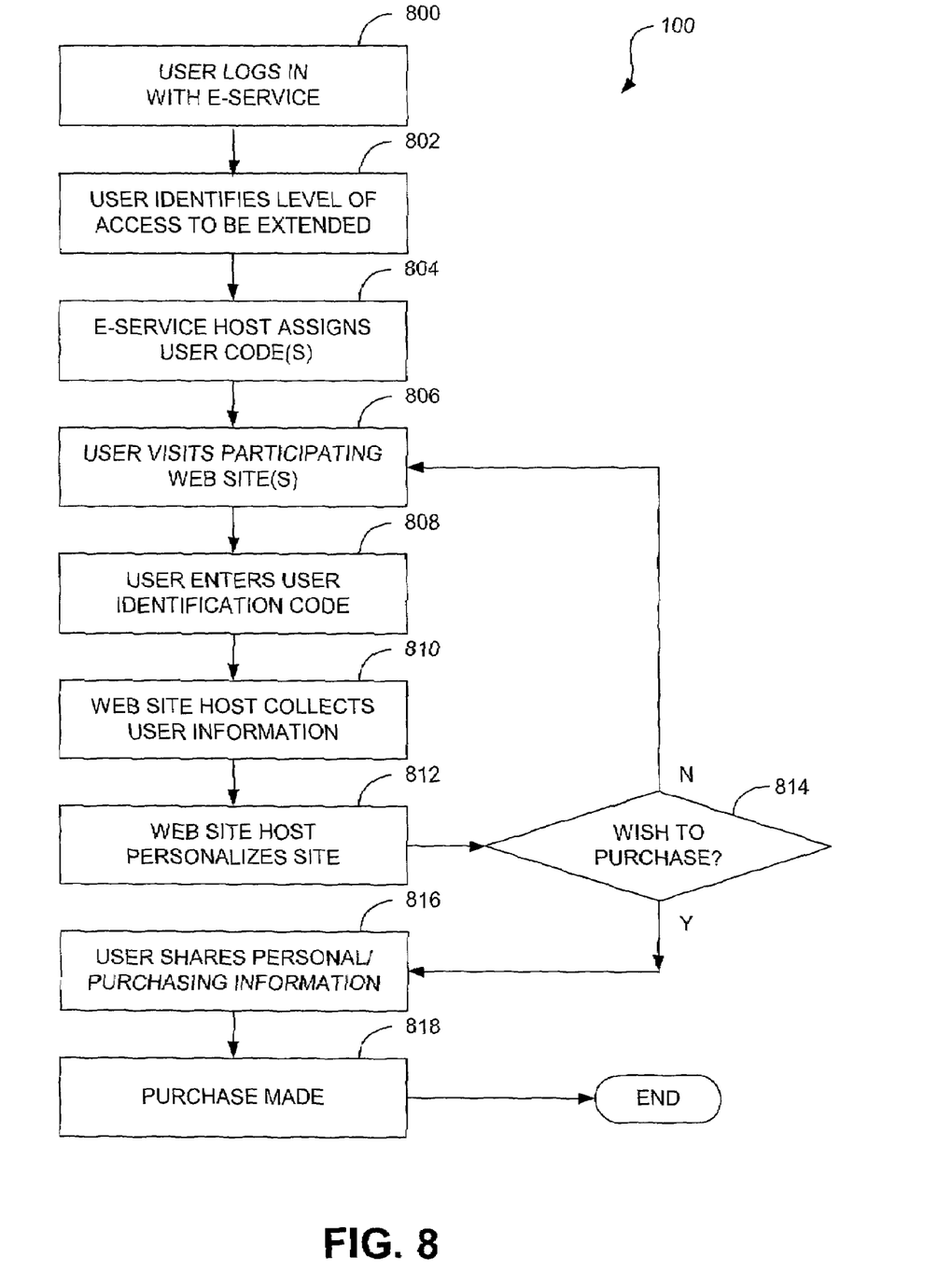
FIG. 8 is a flow diagram that illustrates a second method for sharing user information.

FIG. 8 is a flow diagram that illustrates a second method for sharing user information with the system 100 shown in FIG. 1. As indicated in block 800, a user first logs in with the e-service. Again, this log in is typically achieved via a computing device, such as a computing device 102, that is linked to the e-service host server 106 through the Internet. Once the user has logged in with the e-service, the user can then identify the level of access that will be, at least initially, extended to web site hosts as the user visits web sites on the Internet, as indicated in block 802. After identifying this level, the e-service host assigns one or more user codes to the user, as indicated in block 804. In method illustrated in FIG. 8, however, all codes are directly provided to the user such that the user will be able to manually enter the codes while visiting participating web sites. Typically, the codes comprise strings of letters and/or numbers and preferably are configured as transient keys that are set to expire after a particular duration of time or the satisfaction of some other criteria. Where the user has determined not to reveal certain information such as personal and/or purchase information, the e-service can provide the user with a first code that will allow the user to share profile information only, and a second code which, when provided to the web site host, will allow the user to share enough personal and/or purchase information to complete an online transaction with the web site host. Therefore, the user can browse the web site anonymously while still sharing profile information, and later share more sensitive information should he or she like to make a purchase.

The user can then visit one or more participating web sites as indicated in block 806. Upon arriving at a web site, the user enters the appropriate user code, as indicated in block 808. By way of example, the code can be entered within a data field presented to the user with a home page of the visited web site. Once the code is entered, the web site host can collect the designated user information by requesting it from the e-service host, as indicated in block 810, and the web site can be personalized, as indicated in block 812. As described above in relation to FIG. 7, if the user locates an item that he or she is interested in, the user can determine whether he or she would like to purchase the item, as indicated in decision element 814. If not, flow returns to block 806. If so, flow continues to block 816 at which the user shares personal and/or purchase information with the web site host by providing another user code to the web site host which the host can use to access further information. The user can then purchase the item, as indicated in block 818. Again, the user can later return to the site anonymously, if desired, in the manner described above by providing the site host with the anonymous code.

While particular embodiments of the invention have been disclosed in detail in the foregoing description and drawings for purposes of example, it will be understood by those skilled in the art that variations and modifications thereof can be made without departing from the scope of the invention as set forth in the following claims. For instance, although not explicitly noted above, it is to be appreciate that substantially all of the network transmissions described above can be provided with some level of security (e.g., encryption) to ensure that the data transmitted is not easily intercepted and/or viewed.

What is claimed is:

1. A method for sharing user information, the method comprising:

receiving with a network service an identification of a level of access to user information that is to be extended to a web site host, the identification being received from a user computer via a network;

assigning with the network service a user code that is pertinent to the identified level of access;

sending the assigned user code from the network service to the user computer via a network to enable the user to provide the user code to the web site host when the user visits a web site maintained by the web site host;

receiving from the web site host via a network with the network service a request for information concerning the user and the user code that was provided to the web site host;

determining with the network service a level of access for which the web site host is authorized from the user code received from the web site host; and transmitting from the network service to the web site host via a network user information that pertains to the user code.

2. The method of claim 1, wherein the user code comprises a transient key.

3. The method of claim 1, wherein determining the level of access comprises comparing the user code provided by the web site host with a user code assigned to the user and relevant to a particular user information set.

4. The method of claim 1, wherein transmitting user information comprises transmitting user information from a centralized repository associated with the network service which stores user information for a plurality of users.

5. The method of claim 1, wherein transmitting user information comprises transmitting user profile information while withholding personal information about the user.

6. The method of claim 1, wherein receiving an identification of a level of access comprises receiving selection of one of an anonymous mode in which only profile information and no personal information is provided, and a full disclosure mode in which profile information and personal information is provided.

7. The method of claim 6, wherein receiving an identification of a level of access further comprises receiving user selection of a category of information to share.

8. The method of claim 7, wherein receiving user selection of a category comprises receiving user selection of at least one of a personal category, a business category, and a financial category.

9. The method of claim 1, wherein assigning a user code comprises assigning a first code pertinent to an initial level of access to be provided to the web site host and a second code pertinent to a deeper level of access that can be manually provided by the user if desired.

10. A system associated with a network service for sharing user information, the system comprising:
    means for assigning a user code that is pertinent to a level of access selected by a user that is to be extended to a web site host;
    means for sending the user code from the network service to a user computer via a network to enable the user to provide the user code to the web site host when the user visits a web site maintained by the web site host;
    means for receiving from the web site host via a network the user code provided to the web site host by the user computer;
    means for determining a level of access for which the web site host is authorized from the user code received from the web site host; and
    means for transmitting from the network service to the web site host via a network user information that pertains to the user code.

11. The system of claim 10, wherein the means for determining the level of access comprises means for comparing the user code provided by the web site host with a user code assigned to the user and relevant to a particular user information set.

12. A method for sharing user information, the method comprising:
    receiving with an e-service various user information sent to the e-service from a user computer via a network, the user information to be distributed to web site hosts visited by the user and being separated into sets each associated with a given levels of access to user information;
    assigning with the e-service a user code to each level of access and therefore each information set;
    receiving from the user computer with the e-service via a network selection of a level of access that is to be granted to web sites visited by the user;
    sending to the user computer from the e-service via a network a user code associated with the selected level of access;
    receiving from a web site host with the e-service a user code that was provided to the web site host by the user;
    determining with the e-service a level of access for which the web site host is authorized from the user code received from the web site host; and
    transmitting from the e-service to the web site host user information that pertains to the user code received from the web site host.

13. The method of claim 12, wherein the user code was automatically provided to the web site host upon the user first visiting a web site hosted by the web site host.

14. The method of claim 13, wherein the user code was automatically appended to a uniform resource locator (URL) of the web site.

15. The method of claim 12, further comprising the web site host generating a personalized web site for the user based upon the user information that is transmitted to the web site host from the e-service.

16. A system for sharing user information, comprising:
    means for receiving with an e-service various user information sent to the e-service with a user computer via a network, the user information to be distributed to web site hosts visited by the user and being separated into sets each associated with a given levels of access to user information;
    means for assigning with the e-service a user code to each level of access and therefore each information set;
    means for receiving from the user computer with the e-service via a network selection of a level of access that is to be granted to all web sites visited by the user;
    means for sending to the user computer from the e-service via a network a user code associated with the selected level of access;
    means for receiving from a web site host with the e-service a user code that was provided to the web site host by the user;
    means for determining with the e-service a level of access for which the web site host is authorized from the user code received from the web site host; and
    means for transmitting from the e-service to the web site host user information that pertains to the user code received from the web site host.

17. The system of claim 16, wherein the user code was automatically provided to the web site host upon the user first visiting a web site hosted by the web site host.

18. The system of claim 17, wherein the user code was automatically appended to a uniform resource locator (URL) of the web site.

19. The system of claim 16, further comprising means provided by the web site host for generating a personalized web site for the user based upon the user information that is transmitted to the web site host from the e-service.

20. A method comprising:
    a user sending various user information from a user computer to an online service via the Internet, wherein the user information comprises information that the user may wish to share with hosts of web sites that the user will visit;
    the online service storing the user information received from the user computer;
    the online service assigning a user code to a first portion of the user information;
    the online service sending the user code to the user computer via the Internet to enable the user to provide the user code to the web site hosts;
    the user providing the user code to a first web site host upon visiting a web site hosted by the first web site host;

the first web site host sending the user code received from the user to the online service;

the online service determining a level of access for which the first web site host is authorized from the user code; and the online service sending to the first web site host user information that pertains to the user code.

21. The method of claim 20, wherein the user providing the user code to a first web site host comprises automatically providing the user code to the 1$^{st}$ web site host when the user visits the web site hosted by the first web site host.

22. The method of claim 21, wherein the user code is automatically appended to a uniform resource locator (URL) of the web site hosted by the first web site host.

23. The method of claim 20, wherein providing the user code to a first web site host comprises the user manually providing the user code to the 1$^{st}$ web site host with the web site hosted by the first web site host.

24. The method of claim 20 further comprising:

the online service assigning a second user code to a second portion of the user information;

the online service sending the second user code to the user computer via the Internet to enable the user to provide the second user code to the web site hosts;

the user providing the second user code to the first web site host upon deciding to purchase something from the first web site hosts;

the fisrt web site host sending the second user code received from the user to the online service;

the online service determining a level of access for which the first web site host is authorized from the second user code; and the online service sending to the first web site host user information that pertains to the second user code.

\* \* \* \* \*

UNITED STATES PATENT AND TRADEMARK OFFICE
CERTIFICATE OF CORRECTION

PATENT NO. : 7,272,849 B2 Page 1 of 1
APPLICATION NO. : 09/838807
DATED : September 18, 2007
INVENTOR(S) : Michael T. Brown It is certified that error appears in the above-identified patent and that said Letters Patent is hereby corrected as shown below:

In column 14, line 9, in Claim 24, delete "hosts" and insert -- host --, therefor.

In column 14, line 10, in Claim 24, delete "fisrt" and insert -- first --, therefor.

Signed and Sealed this

Twenty-ninth Day of July, 2008

JON W. DUDAS
*Director of the United States Patent and Trademark Office*